(No Model.)

J. H. E. DE CELLES & G. W. WELLS.
EYEGLASSES.

No. 492,622. Patented Feb. 28, 1893.

Witnesses
L. B. Tenny.
Katie Farrell.

Inventors:
J. H. Ernest De Celles
George W. Wells
By Attorney
John C. Dewey.

UNITED STATES PATENT OFFICE.

JOSEPH H. ERNEST DE CELLES AND GEORGE W. WELLS, OF SOUTHBRIDGE, MASSACHUSETTS, ASSIGNORS TO THE AMERICAN OPTICAL COMPANY, OF SAME PLACE.

EYEGLASSES.

SPECIFICATION forming part of Letters Patent No. 492,622, dated February 28, 1893.

Application filed September 26, 1892. Serial No. 446,893. (No model.)

*To all whom it may concern:*

Be it known that we, JOSEPH H. ERNEST DE CELLES and GEORGE W. WELLS, both citizens of the United States, and both residing at Southbridge, in the county of Worcester and State of Massachusetts, have jointly invented certain new and useful Improvements in Eyeglasses; and we do hereby declare that the following is a full, clear, and exact description thereof, which in connection with the drawings, making a part of this specification, will enable others skilled in the art to which our invention belongs to make and use the same.

Our invention relates to eyeglasses, and to that class of eyeglasses to which the lenses are moved apart in a straight line, and more particularly to the manner of connecting the lenses.

The object of our invention is to improve upon the construction of eyeglasses of the class above referred to, as now ordinarily made, and to provide an eyeglass of simple and inexpensive construction, in which the lenses are so connected that they will be moved apart in a straight line, and either lens may be moved independently of the other lens, and the bridge or connection between the lenses may be moved independently of the lenses.

Our invention consists in certain novel features of construction of the bridge or connection between the lenses, as will be hereinafter fully described, and the nature thereof indicated by the claims.

Figure 1:
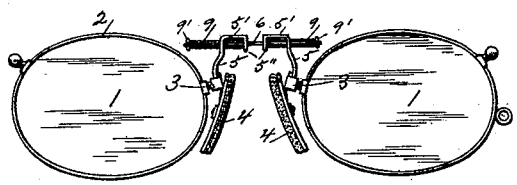
Figure 2:
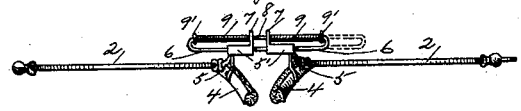
Figure 3:
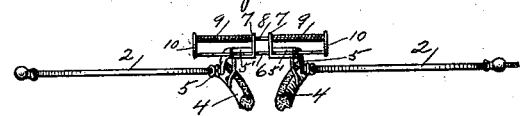

Referring to the drawings: Figure 1 is a front view of an eyeglass embodying our improvements, with the lenses slightly moved apart. Fig. 2 is a top view of the eyeglass shown in Fig. 1. Fig. 3 is a top view of an eyeglass, showing a modification of the bridge or connection shown in Figs. 1 and 2, and Fig. 4 is a front elevation of the eyeglass shown in Fig. 3.

In the accompanying drawings, the lenses 1, wire rims 2, posts 3, and nose pieces or guards 4, may be of any ordinary and well known construction, as our present invention relates only to the bridge or connection between the lenses. The bridge side arms 5 are secured at their lower ends to the posts 3, and preferably extend up in a substantially vertical plane from the posts to a point substantially on a line with the top of the wires 2, see Fig. 1. The upper portion 5' of the bridge side arms 5 are bent in this instance toward each other, to extend in a plane at substantially right angles to the main portion, and the extreme ends 5'' may be bent downwardly to extend in a plane substantially at right angles to the portions 5', and parallel to the main portion, see Fig. 1. The bridge side arms 5 are provided with a hole or perforation in the upper part of the main portion thereof, and with a hole or perforation in the ends 5''. The upper ends of the bridge side arms 5 form the supports for the rods forming the nose bridge.

The nose bridge consists preferably of two rods or wires 6 and 8, connected at their outer ends, and supported in the upper ends of the bridge side arms 5; one of the rods, as 6, supported in the holes in the main portions thereof, and the other rod, as 8, supported in ears 7 on said side arms 5, see Fig. 2. I prefer to make both rods 6 and 8 of one piece of wire, with the two adjoining ends soldered or otherwise connected, so as to make but a single joint in the two rods, as shown in Figs. 1 and 2, and to have both ends loosely supported in the upper ends of the bridge side arms, so that they may be moved longitudinally therein, independently of the lenses, as indicated by dotted lines, see Fig. 2. Upon one of the rods, in this instance upon the rear rod 8, is supported one or more spiral springs, in this instance two springs 9, the outer ends of which bear, in this instance, against collars 9' on the outer ends of the rod 8, and the inner ends against the ears 7 on the bridge side arms 5. The spring or springs 9 act to move the bridge side arms 5, and the lenses toward each other, after they have been moved apart, and press the nose pieces or guards on the nose of the wearer. We prefer to use two springs 9, as a more certain and even pressure is obtained, but very good results will be obtained with only one spring.

Figure 4:
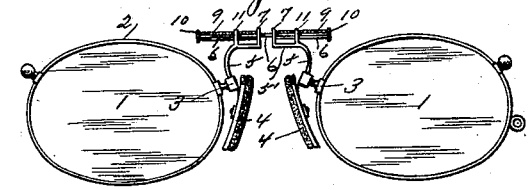

In Figs. 3 and 4 we have shown the two rods 6 and 8 made of two pieces of wire, with their ends connected by plates 10; and the upper ends of the bridge side arms 5, instead of extending over the connecting rods, as shown in Figs. 1 and 2, extend below the rods, and are provided with upwardly extending ears 11, as shown in Figs. 3 and 4, in which are supported and move the rods 6 and 8, in the same manner as described in connection with Figs. 1 and 2.

It will be understood, that the details of construction of our improvements may be varied somewhat if desired, and we do not limit ourselves to the exact construction of the nose bridge shown in the drawings and above described. For example one of the springs 9 may be left off if desired, but I prefer to use two springs.

Having thus described our invention, what we claim as new, and desire to secure by Letters Patent, is—

1. In eyeglasses, the combination with the bridge side arms, secured at their lower ends to the posts of the eyeglasses, and provided with holes or perforations in their upper ends, in which are loosely supported the two rods forming the bridge or connection between the lenses, of said rods, on which the bridge side arms are free to move, with their ends rigidly connected, and a spiral spring or springs supported on one of said rods between the ends thereof, and the ends of the bridge side arms, for the purpose stated, substantially as set forth.

2. In eyeglasses, the combination with the bridge side arms, secured at their lower ends to the posts, and provided with holes or perforations in their upper ends, of two rods forming the bridge or connection between the lenses, with their ends rigidly connected, and loosely supported in the holes in the bridge side arms, so as to move longitudinally therein, and one or more spiral springs supported on one of said rods for moving toward each other the bridge side arms, and the lenses, substantially as set forth.

3. In eyeglasses, the combination with the bridge side arms, secured at their lower ends to the posts, and provided with holes or perforations in their upper ends, of two rods forming the bridge or connection between the lenses, made of one piece of wire, and loosely supported in the bridge side arms, so as to move longitudinally therein, and one or more spiral springs supported on one of said rods, for moving toward each other the bridge side arms and the lenses, substantially as set forth.

4. In eyeglasses, the combination with the bridge side arms, secured at their lower ends to the posts, and provided with holes or perforations in their upper ends, of two rods forming the bridge or connection between the lenses, made of one piece of wire, said wire loosely supported in the holes in the bridge side arms, and adapted to be moved longitudinally therein, independently of said side arms, and one or more springs supported on one of said rods, and interposed between the ends of the rods and the ends of the bridge side arms, for the purpose stated, substantially as set forth.

5. In eyeglasses, the combination with the bridge side arms, of two rods forming the bridge between the lenses and loosely supported in said bridge side arms, so as to have a longitudinal motion therein, independent of the lenses, and a spiral spring or springs supported on one of said rods, substantially as set forth.

J. H. ERNEST DE CELLES.
GEORGE W. WELLS.

Witnesses:
CHANNING M. WELLS,
CHARLES F. HILL.